United States Patent
Le Neel

(10) Patent No.: US 11,359,913 B2
(45) Date of Patent: *Jun. 14, 2022

(54) DEVICE FOR THE CONTACTLESS THREE-DIMENSIONAL INSPECTION OF BLADES FOR A TURBOMACHINE, ESPECIALLY AN AIRCRAFT TURBINE OR JET ENGINE

(71) Applicant: DWFritz Automation, Inc., Wilsonville, OR (US)

(72) Inventor: Didier Le Neel, Vern sur Seiche (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/983,772

(22) Filed: Aug. 3, 2020

(65) Prior Publication Data

US 2021/0116238 A1    Apr. 22, 2021

Related U.S. Application Data

(63) Continuation of application No. 15/969,320, filed on May 2, 2018, now Pat. No. 10,731,975, which is a (Continued)

(30) Foreign Application Priority Data

Nov. 2, 2015  (FR) ..................... 1560486

(51) Int. Cl.
*G01B 11/25* (2006.01)
*G01B 11/245* (2006.01)

(52) U.S. Cl.
CPC ........ *G01B 11/2522* (2013.01); *G01B 11/245* (2013.01); *F05D 2260/80* (2013.01); *F05D 2260/83* (2013.01); *G01B 2210/46* (2013.01)

(58) Field of Classification Search
CPC ..... G01B 11/245; G01B 11/005; G01B 11/26; G01B 11/2416; F05D 2260/80; F05D 2260/83
See application file for complete search history.

(56) References Cited

U.S. PATENT DOCUMENTS

| 4,547,674 A | 10/1985 | Pryor et al. |
| 5,444,536 A * | 8/1995 | Satzger ............... G01B 11/2545 356/613 |

(Continued)

FOREIGN PATENT DOCUMENTS

| CN | 101458072 A | 6/2009 |
| CN | 103307998 A | 9/2013 |

(Continued)

OTHER PUBLICATIONS

DWFritz Automation, Inc., "Device for the Contactless Three-Dimensional Inspection of Blades for a Turbomachine, Especially an Aircraft Turbine or Jet Engine", China Patent Application No. 201680068872.9, Office Action and English Translation, filed Nov. 2, 2016.

(Continued)

*Primary Examiner* — Sang H Nguyen
(74) *Attorney, Agent, or Firm* — Stoel Rives LLP

(57) ABSTRACT

A device is proposed for the contactless three-dimensional inspection of a blade (5) for a turbomachine, comprising:
  means for scanning the teeth, comprising at least one first pair of laser measurement modules (2A, 2B) and means for the rotational driving, about the main axis, of the blade relative to the modules along the main axis of the blade;
  means for the rebuilding of a three-dimensional virtual representation of the blade using data coming from said scanning means;
  means of dimensional inspection using the three-dimensional representation;
  each pair of modules comprising a first module (2A) oriented towards a first face of a tooth and a second module oriented towards a second face of a tooth;
  the modules being oriented relative to the blade so that during a rotation of the blade about the main axis, the (Continued)

scanning means scan the first and second faces of the blade on the entire rim of said blade, and so that during a translation of the blade along the main axis, said scanning means scan the first and second faces of the blade throughout their height.

5 Claims, 6 Drawing Sheets

Related U.S. Application Data continuation-in-part of application No. PCT/EP2016/076336, filed on Nov. 2, 2016.

(56) References Cited

U.S. PATENT DOCUMENTS

| | | | |
|---|---|---|---|
| 5,570,186 A | 10/1996 | Satzger et al. | |
| 6,094,269 A * | 7/2000 | Ben-Dove | G01B 5/205 250/559.22 |
| 8,004,694 B2 * | 8/2011 | Lee | G01B 11/2433 356/625 |
| 2004/0083024 A1 | 4/2004 | Wang | |
| 2005/0201611 A1 * | 9/2005 | Lloyd, Jr. | F01D 5/141 382/152 |
| 2012/0266680 A1 | 10/2012 | Boyer et al. | |
| 2013/0335549 A1 | 12/2013 | Hatcher, Jr. et al. | |
| 2014/0030092 A1 | 1/2014 | Heinig et al. | |
| 2014/0232857 A1 | 8/2014 | Jahnke et al. | |
| 2014/0347473 A1 * | 11/2014 | Wolff | G06T 5/005 348/135 |
| 2015/0047168 A1 | 2/2015 | James et al. | |
| 2015/0193919 A1 | 7/2015 | Nissen et al. | |
| 2015/0241391 A1 | 8/2015 | Makino et al. | |
| 2015/0300920 A1 * | 10/2015 | DeAscanis | F01D 21/003 356/614 |
| 2018/0128596 A1 | 5/2018 | Mies | |

FOREIGN PATENT DOCUMENTS

| | | |
|---|---|---|
| CN | 104567679 A | 4/2015 |
| DE | 4142676 A1 | 7/1993 |
| DE | 102010021421 A1 | 11/2011 |
| JP | 2014202534 A | 10/2014 |
| WO | 2016166035 A1 | 10/2016 |

OTHER PUBLICATIONS

International Search Report and Written Opinion and English Translation dated Jan. 18, 2017 for corresponding International Application No. PCT/EP2016/076337, filed Nov. 2, 2016, 14 pages.

U.S. Notice of Allowance dated Mar. 22, 2019, for corresponding U.S. Appl. No. 15/969,314, filed May 2, 2018, 10 pages.

* cited by examiner

DEVICE FOR THE CONTACTLESS THREE-DIMENSIONAL INSPECTION OF BLADES FOR A TURBOMACHINE, ESPECIALLY AN AIRCRAFT TURBINE OR JET ENGINE

1. CROSS-REFERENCE TO RELATED APPLICATIONS

This Application is a Continuation of U.S. patent application Ser. No. 15/969,320, filed May 2, 2018, now U.S. Pat. No. 10,731,975, issued Aug. 4, 2020; which is a Continuation-in-Part Application of International Application No. PCT/EP2016/076336, filed Nov. 2, 2018, the content of which is incorporated herein by reference in its entirety, and published as WO 2017/076853 on May 11, 2018, not in English.

2. TECHNICAL FIELD

The technical field is that of dimensional measurements.

The disclosure relates more particularly to a device for the three-dimensional contactless inspection of a blade for a turbomachine, for example a jet engine, a turbine a compressor or a pump.

In general, a turbomachine is a machine, a device or an apparatus that acts on a fluid or that actuates a fluid by means of a rotating element. An exchange of energy takes place between the rotating element rotating about its axis of rotation and a fluid in permanent flow.

Turbomachines can be receivers (hydraulic turbines, gas turbines (aircraft engines) for example) or generators (jet engines, aerodynamic turbines, centrifugal pumps, compressors, blowers, pusher propellers for example).

The embodiments of the disclosure can be applied especially but not exclusively to techniques for the inspection of blades used in aeronautics (to provide for the propulsion of an aircraft for example), in the naval field (for the propulsion of a ship for example). It can also be applied to techniques for the inspection of blades used in the field of aerodynamic energy or hydrodynamics (to convert the energy of movement of a fluid into motor energy).

3. BACKGROUND INFORMATION

We shall strive more particularly here below in this document to describe the problems and issues existing in the field of aircraft jet engines that have been faced by the inventors of the present patent application. The disclosed embodiments are of course not limited to this particular field of application but is of interest for any technique for the inspection of blades for turbomachines that have to face proximate or similar problems and issues.

The blades of jet engines, turbojet engines or again turbines are mechanical elements widely used for aeronautical applications. Their function is to transmit kinetic energy to a fluid (gas) when they are coupled with a motor, and thus to propel the aircraft.

A turbojet for example is generally formed by a set of blades working together on an axis of rotation axis and disposed in a plane appreciably perpendicular to this axis. The number of blades varies according to the applications.

During manufacture, the blades must be made with high precision in their dimensions or shape and they should be of constant and suitable quality.

It is therefore necessary to provide for dimensional inspection or controls for each of these components in order to ascertain that they are in truly in compliance with the requisite manufacturing tolerance values. Such inspection is generally performed on the production line and involves a certain number of dimensional characteristics.

A classic solution consists in inspecting these components when they come off the production line, either manually or by using automated dimensional inspection machines such as mechanical sensing machines. These machines are used to acquire the dimensions and a shape of a component and then to check it.

However, the visual inspection of the components responds neither to high production rates nor to quality requirements in aeronautics as defects remain difficult to identify with the naked eye.

Mechanical sensing solutions also require a discontinuous inspection process that needs relatively lengthy inspection time. In addition, propeller blades can have a relatively complex shape and profile making the inspection process difficult, calling for the use of separate machines to enable the inspection of all the dimensional characteristics of these components. In addition, present-day contactless inspection systems cannot be used to achieve the precision and production rates dictated by the manufacturing sector.

It would therefore be desirable to propose an automatic inspection machine capable of carrying out precise, reproducible and high-speed checks on all the dimensional characteristics of blades for turbomachines.

4. SUMMARY OF THE DISCLOSURE

One particular embodiment of the disclosure proposes a device for the contactless three-dimensional inspection of a blade for a turbomachine, for example a jet engine, a turbine, a compressor or a pump, said blade comprising a body extending radially along a main axis between a blade root and a blade tip with a defined height, and comprising a first main face and second main face terminated by a leading edge and a trailing edge. The inspection device is such that it comprises:
- means for scanning said blade, said means for scanning comprising at least one first pair of laser measurement modules, and means of rotational driving about the main axis of said blade relative to the laser measurement modules or vice versa, and means of driving in translation along the main axis of said blade relative to the laser measurement modules or vice versa;
- means for building a three-dimensional virtual representation of said blade using data coming from said scanning means;
- means of dimensional inspection using said rebuilt three-dimensional virtual representation;
- each pair of laser measurement modules comprising a first module oriented towards a first face ($F_A$) of said blade and a second module oriented towards a second face ($F_B$) of a blade; said laser measurement modules being oriented relative to said blade so that:
    during a rotation of said modules or of said blade about the main axis, said scanning means scan the first and second faces of said blade on the entire rim of said blade, and
    during a translation of said modules or of said blade along the main axis, said scanning means scan the first and second faces of said blade throughout their height.

Thus, through an ingenious layout of at least one pair of laser measurement modules, the three-dimensional inspection device according to the disclosure enables the automatic and contactless performance of a full and precise scan of the entire blade to be inspected. An inspection of the totality of the dimensional characteristics of the blade can then be performed using measurement points derived from the scanning means.

The device can therefore provide for simultaneous motion in rotation and in translation of the blade relative to the laser measurement modules, or vice versa.

Thus, unlike existing solutions, the device according to the disclosure can be used to determine a cloud of measurement points for the blade in three dimensions, within a few seconds and throughout its surface. Depending on the laser technology embedded in the measuring modules and on the associated method of inspection and of building the three-dimensional representation, it is possible to carry out an inspection of the blade at very high speeds (a duration of approximately one to five seconds).

According to one particular aspect of the disclosure, each laser measurement module comprises a source of emission of a laser beam oriented relative to the main axis and relative to an axis tangential to said blade and a laser beam receiver oriented to pick up the laser beam coming from said blade.

According to one particular characteristic, the laser beam is oriented relative to the main axis by a first angle ranging from 10 to 45 degrees and relative to the tangential axis by a second angle ranging from 10 to 45 degrees.

According to one particular characteristic, the means for driving in rotation and the means for driving in translation are activated simultaneously or sequentially.

Thus, it is possible to carry out the scanning operations (and therefore to acquire measurement points) with simultaneous driving in rotation and in translation of said blade relative to the laser measurement modules or vice versa and with driving in rotation and driving in translation that are independent and succeed each other in a pre-established order.

According to one particular characteristic, the modules are provided with a line-type laser-emitting source.

5. BRIEF DESCRIPTION OF THE DRAWING FIGURES

Other features and advantages of the disclosure shall appear from the following description given by way of an indicatory and non-exhaustive example and from the appended drawings of which:

Figure 4:
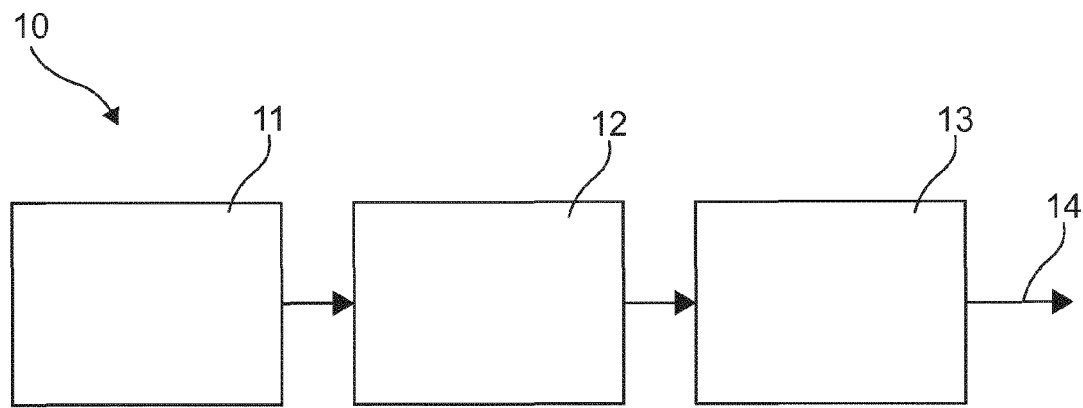
Figure 5:
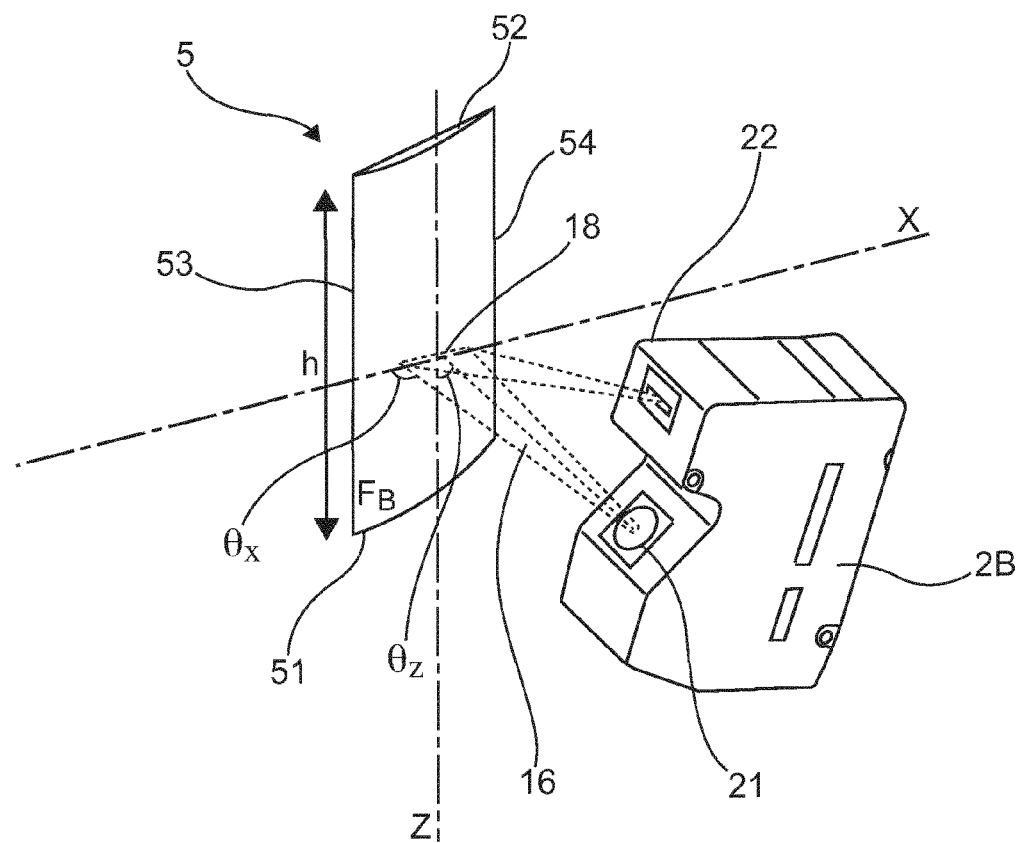
Figure 4A:
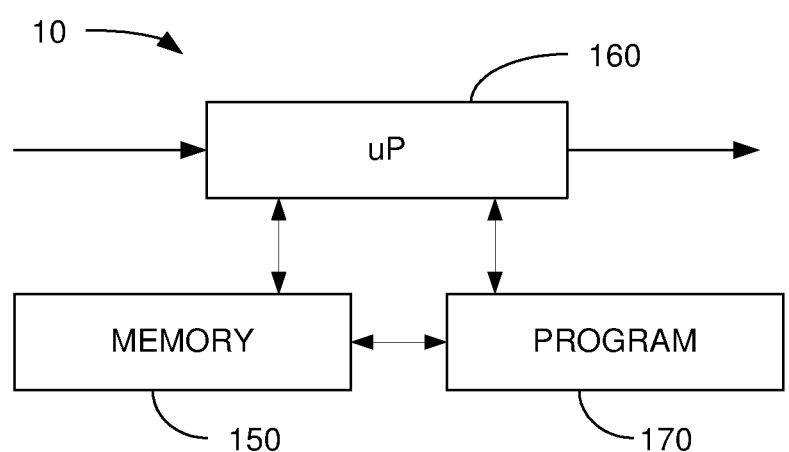

FIG. 4 presents the schematic structure of a three-dimensional inspection device in the form of functional blocks, according to one particular embodiment of the disclosure;

FIG. 4A illustrates an exemplary structure of the inspection device for a particular embodiment;

FIG. 5 is a detailed view of a measurement module during the scanning of one of the main faces of the blade to be inspected.

6. DETAILED DESCRIPTION OF EMBODIMENTS

In all the figures of the present document, the identical elements are designated by one and the same numerical reference.

FIGS. 1, 2A to 2C present the structure and the working of a contactless three-dimensional inspection device 1 according to one particular embodiment of the disclosure. The mechanical component subjected to three-dimensional inspection here is an aircraft jet engine or turbine blade 5.

Naturally, this is an illustrative example and other types of blades for other applications can of course be envisaged without departing from the framework of the disclosure.

Figure 1:
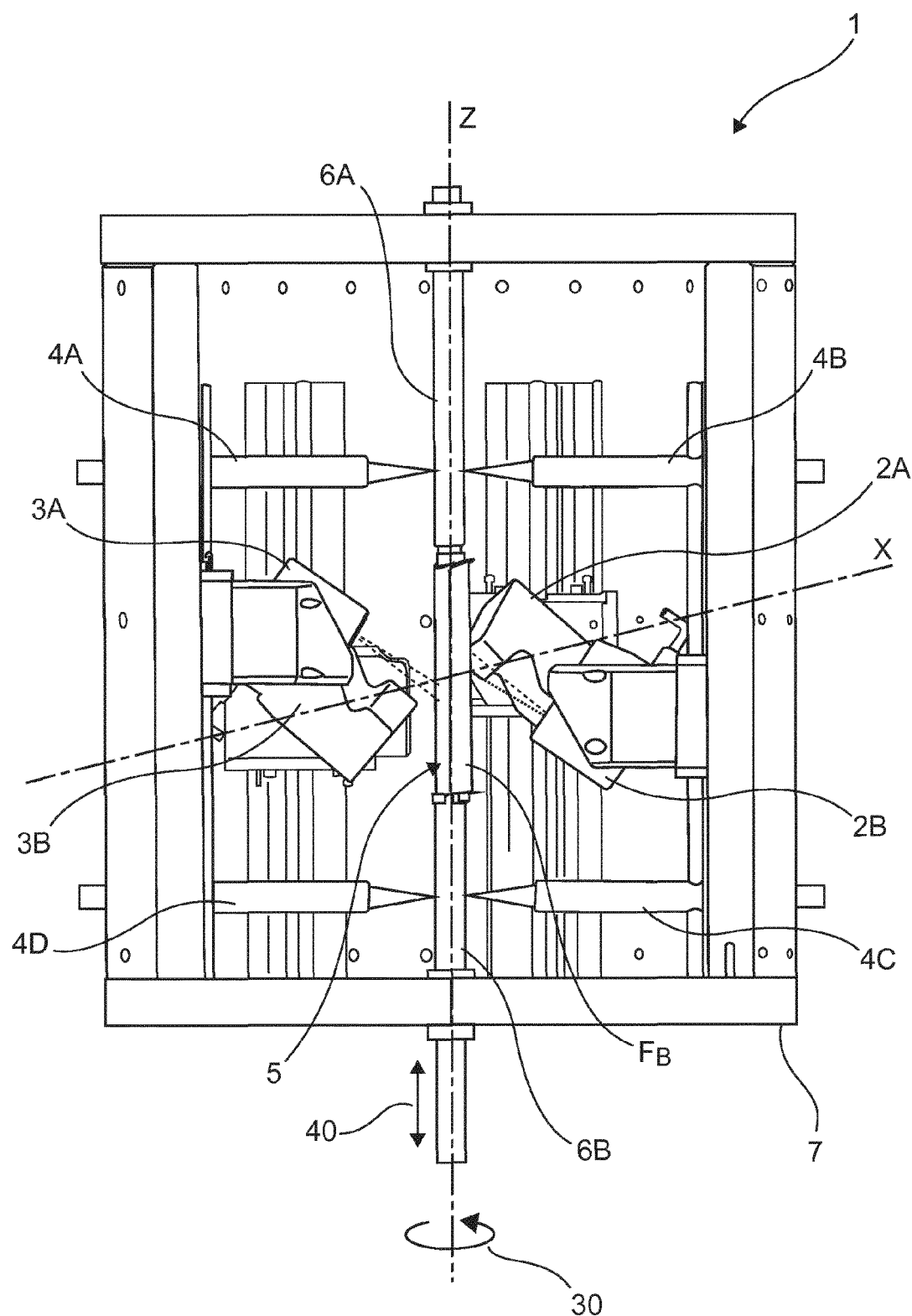
FIG. 1 is a view in perspective or three-quarter view of a set of measurement modules of a three-dimensional inspection device, according to one particular embodiment of the disclosure.
Figure 2A:
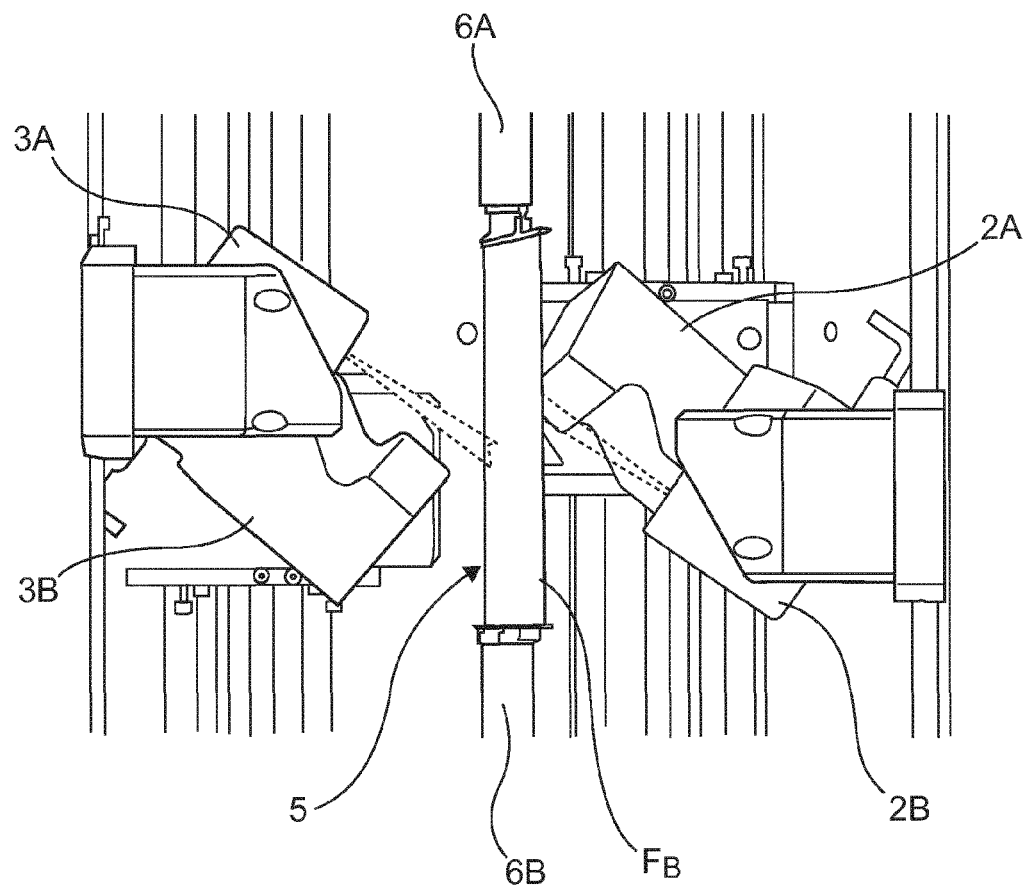
FIGS. 2A-2C represent partial and detailed views of the inspection device illustrated in FIG. 1.
Figure 2B:
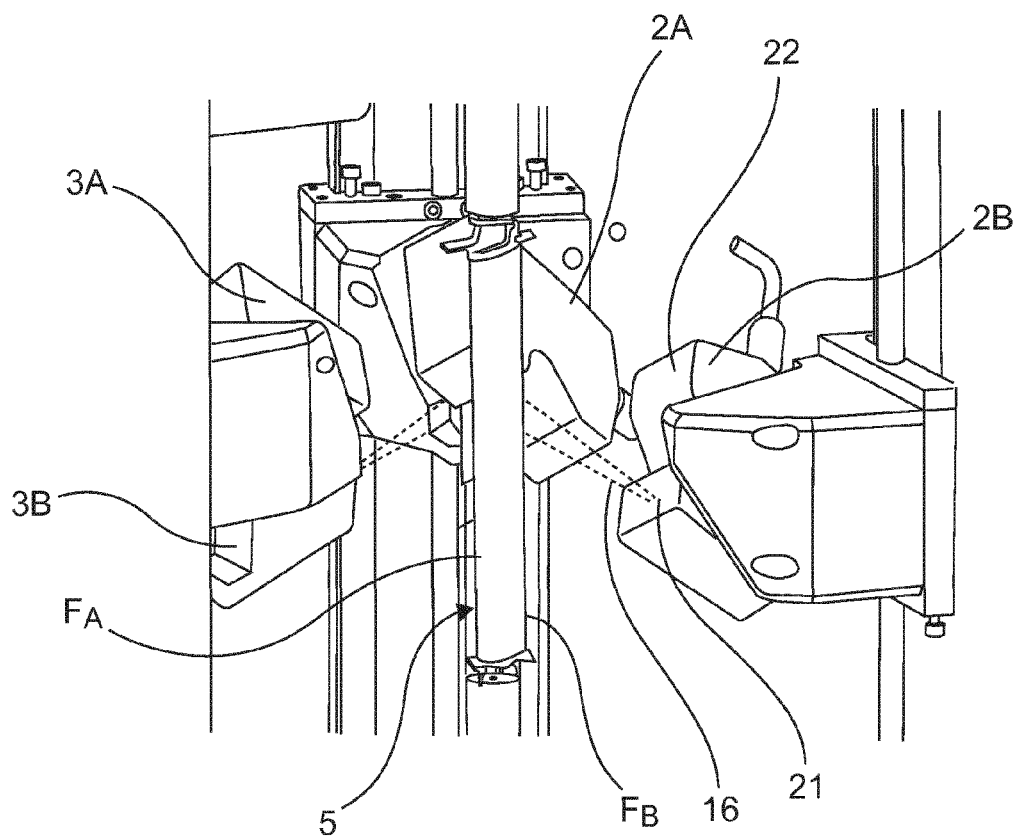
Figure 2C:
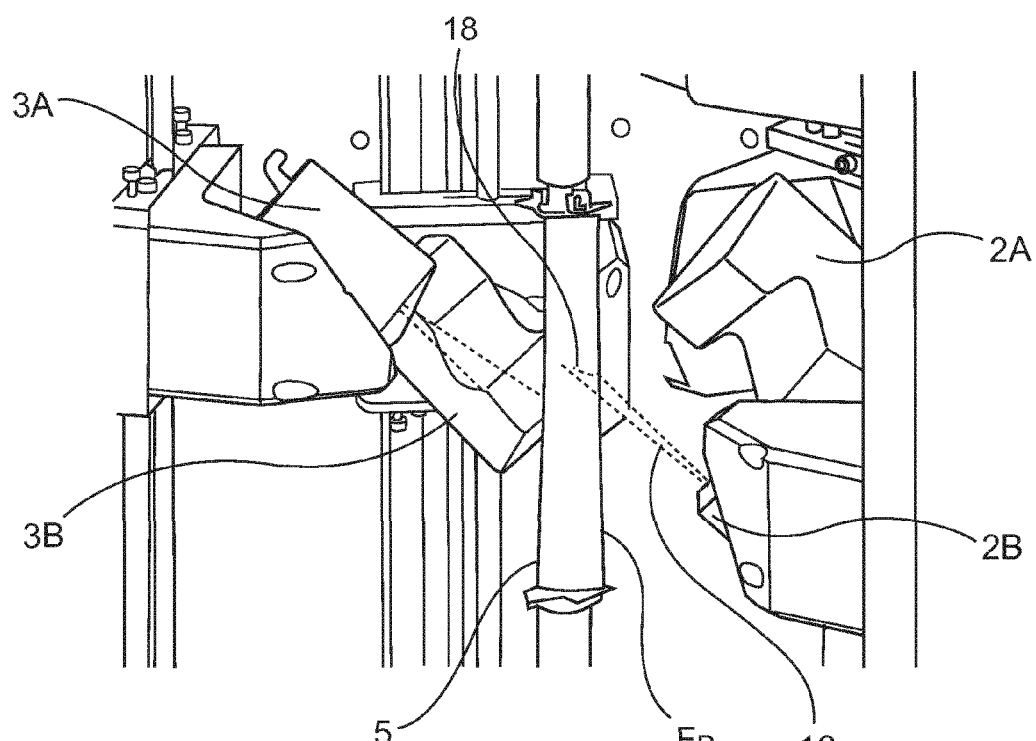
Figure 3A:
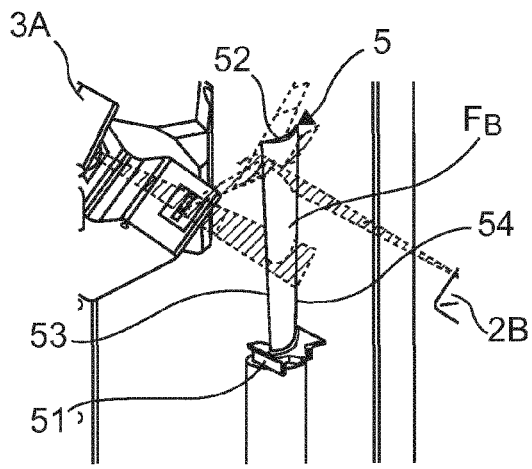
FIGS. 3A-3F are views of the turbine blade subjected to a three-dimensional inspection during different phases of laser scanning as illustrated in FIGS. 1, 2A, 2B and 2C.
Figure 3D:
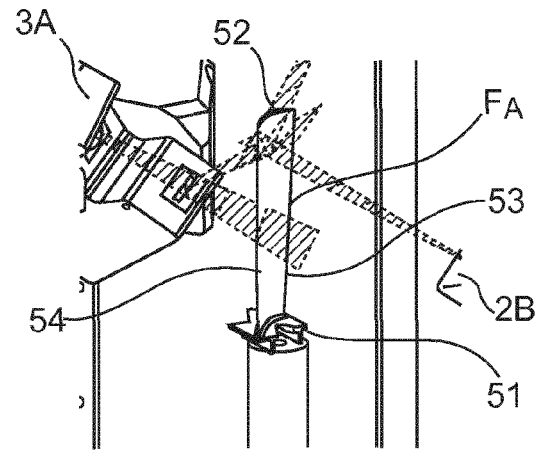
Figure 3B:
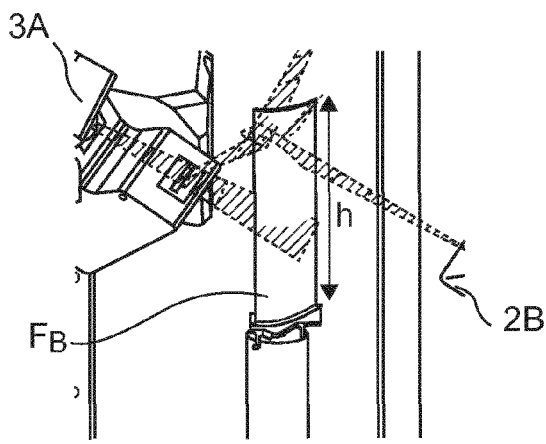
Figure 3E:
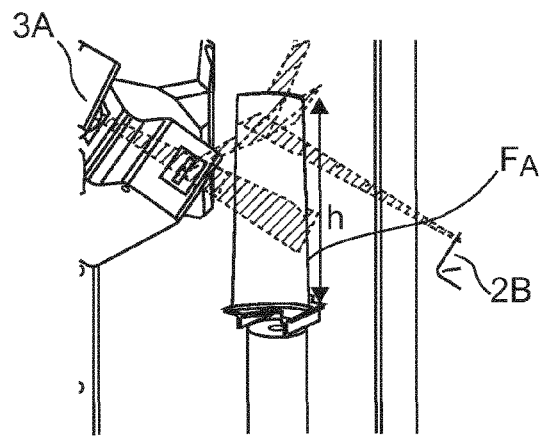
Figure 3C:
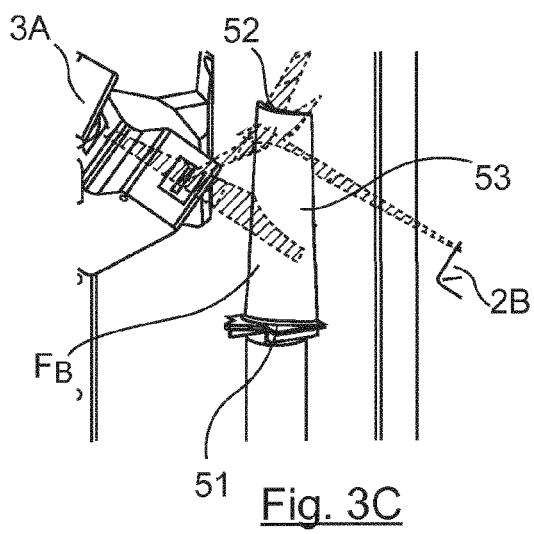
Figure 3F:
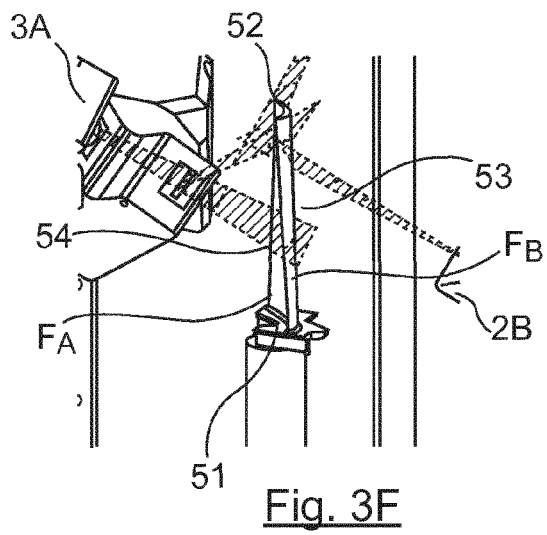

The blade generally comprises a body 50 extending radially along a main axis (Z) between a blade root 51 and a blade tip 52 with a defined height h and comprising a first and second main faces $F_A$ and $F_B$ terminated by a leading edge 53 and a trailing edge 54. The first face $F_A$, commonly called the inner face or intrados, has a substantially concave shape and the second face $F_B$, commonly called the outer face or extrados, has a substantially convex shape. The structure of the blade 5 is illustrated in greater detail in FIGS. 3A and 3F.

The term "radially" is used because a blade generally consists of a body extending radially from the rotation element of the turbine (shaft or hub for example).

The inspection device 1, in the embodiment illustrated here, comprises two vertical arms 6A and 6B to hold the blade 5 to be inspected within the frame 7 along its main axis Z. The holding arm 6A holds the blade at the level of its head 51 and the holding arm 6B holds the blade at the level of its foot 52. The two holding arms 6A and 6B are in addition mounted so as to be rotationally mobile about the main axis Z relative to the frame 7 of the device (arrow referenced 30) and mobile in translation along the main axis Z relative to the frame 7 of the device (arrow referenced 40). To this end, the two holding arms 6A and 6B co-operate with a dual system of rotational and translational driving (not shown), enabling the blade 5 to be put into rotation and/or translation relative to the frame 7 that is fixed to it.

Several physical implementations are possible: for example, the arm 6B can co-operate with a system of dual driving in rotation and in translation and the arm 6A can co-operate with a system of single driving in translation to guide the blade along its main axis. For certain configurations of the blade, it must be noted that only the holding arm 6B is needed to drive the blade in rotation and in translation.

The arms 6A and 6B and the driving system or systems associated with them form the means of driving the device according to the disclosure in rotation and in translation.

Besides, the inspection device 1 according to the disclosure implements four laser measurement modules dedicated to the measurement and inspection of the blade 5: a first pair of laser measurement modules 2A-2B dedicated to a first surface measurement of the blade 5 and a second pair of laser measurement modules 3A-3B dedicated to a second surface measurement of the blade 5. More particularly, each pair of laser measurement modules (2A-2B; 3A-3B) consists of a first module (2A; 3A) oriented towards the inner face or intrados $F_A$ of the blade 5 and a second module oriented towards the outer face or extrados $F_B$ of the blade 5.

Let us consider the axis X as being the axis tangential to the main faces and orthogonal to the main axis Z at the level of a measurement line on the blade. Thus, the first modules 2A and 3A are substantially inclined upwards relative to the tangential axis X of the blade 5 and the second modules 2B and 3B are substantially inclined downwards relative to the tangential axis X of the blade 5.

Each laser measurement module of each of the two pairs of modules 2A-2B and 3A-3B represented here is fixedly attached to the frame by means of a support that can be configurable or modulable according to the type of the blade to be inspected and its dimensional characteristics. This enables each measurement module to be oriented appropriately as a function of the shape and dimensions of the blade to be inspected. The orientation of the laser measurement modules 2A-2B, 3A-3B must be adapted to the shape and dimensions of the faces of the blade 5 and the laser coverage capacity (field of measurement) of the measurement modules used in the inspection device (the laser coverage can effectively vary from a few millimeters to a few centimeters depending on the technology implemented by the measurement modules). An automated motor drive of the module supports could be envisaged to provide for a real-time orientation of the modules relative to the surface of the blade.

In the example illustrated here, the laser measurement modules 2A, 2B, 3A and 3B are fixed and it is the blade 5 that is mobile in rotation and in translation relative to the main axis Z of the blade 5. Naturally, it is possible to envisage an alternative embodiment in which the blade 5 is fixed and in which it is the frame to which the measurement modules are fixedly attached that is mounted so as to be mobile in rotation and in translation about the main axis Z of the blade 5.

All the laser measurement modules illustrated here as well as the means of driving in rotation and in translation discussed further above constitute the scanning means of the device according to the disclosure. The scanning means are associated with means for the processing of measurements acquired by the scanning means (the principle of which is described in detail further below with reference to FIG. 4) to rebuild the three-dimensional surface of the blade 5 and to carry out a dimensional inspection of this blade 5.

According to the disclosure, the laser measurement modules 2A, 2B, 3A and 3B are oriented relative to the blade 5 so that, during a rotation of the blade 5 about its main axis Z, the scanning means scan the inner faces $F_A$ and out faces $F_B$ on the entire rim of the blade (scanning on the width of the faces $F_A$ and $F_B$) and during a translation of the blade 5 along its main axis Z, the scanning means scan the outer face or intrados $F_A$ and outer face or extrados $F_B$ of the blade 5 throughout their height h.

FIGS. 3A to 3F represent different phases of the process of laser scanning of the turbine blade 5. FIG. 5 shows a more detailed view of the measurement module 2B during the laser scanning of the extrados $F_B$ of the turbine blade 5.

The measurement module 2B is, in this example, a laser measurement module working according to the principle of laser triangulation. In a known way, such a measurement module is capable of measuring a distance by angular computation. It also covers a wide range of measurements and has high resolution. Known technologies other than laser triangulation can of course be used without departing from the framework of the disclosure. The measurement module 2B comprises a laser emission source 21, for example a laser diode that projects a plane laser beam 16 on one of the faces of the blade to be scanned (here the main face $F_B$) and a laser receiver 22, for example a CCD (Charge-Coupled Device) type sensor or CMOS (Complementarity Metal-Oxide-Semiconductor) type sensor. The laser emission source and the corresponding laser receiver are situated on the same face of the measurement module, this face being oriented towards the blade 5.

The other measurement modules 2A, 3A and 3B are preferably identical. In general, to maximize the laser scanning quality, the measuring modules of each pair must be of identical technology.

When the scanning phase is activated, the laser beam emitted by the source is reflected on the face $F_B$ of the blade for which it is desired to know the position or the distance relative to the laser source (i.e. relative to the measurement module 2B). The laser receiver 22 is oriented to pick up the laser beam coming from the blade 5. The reflected laser beam reaches the receiver 22 at an angle that depends on the distance. The position of the reflected laser beam on the receiver 22 as well as the distance from the source and the receiver to the measurement module 2B enables the information on distance to be deduced for each measurement point acquired.

The intersection between the laser beam 16 and the face $F_B$ of the blade forms a laser scanning line 18 that moves on the scanned face $F_B$ as and when the blade 5 rotates about its main axis Z as and when the blade 5 gets translated along its main axis Z. The scanning of the blade 5 on its rim is provided by the rotation of the blade relative to the measurement modules about its main axis Z and the scanning of the blade 5 throughout its height is provided by means of the translation of the blade 5 relative to the measurement modules.

In general, it can be planned to carry out scanning operations (and therefore to acquire measurement points) for the turbine blade 5:
- by means of a simultaneous driving in rotation and in translation of the blade 5 relative to the laser measurement modules 2A, 2B, 3A, 3B (or vice versa) providing for a complete scanning of the blade 5, or
- by means of driving in rotation and driving in translation independent of the blade 5 relative to the laser measurement modules 2A, 2B, 3A, 3B (or vice versa) succeeding each other in a pre-established order, providing for a full scan of the blade 5.

According to one particular aspect of the disclosure, the measurement module 2B is oriented towards the second face $F_B$ so that the laser beam is inclined upwards relative to the tangential axis X by an angle θx of 10 to 45 degrees (for example 30 degrees) and an angle θz relative to the main rotation axis Z of 10 to 45 degrees (for example 20 degrees). The angles θx and θz depend especially on the angle of inclination of the face of the blade to be scanned.

The same principle can be applied to the first module 2A of the pair of measurement modules 2A and 2B, the laser beam of said module 2A having to be tilted downwards relative to the tangential axis X of the angle θx to face the front of the corresponding blade $F_A$.

It must be noted that the number of pairs of the measurement modules is not limited to the example illustrated here above. A greater number (i.e. a number greater than 2) or a smaller number (i.e. a number smaller than 2) could be envisaged without departing from the framework of the disclosure, especially depending on the complexity of the shape of the blade, the number of measurement points desired and/or the processing time desired and/or other parameters that those skilled in the art will deem it appropriate to take into account.

FIG. 4 now presents the generic characteristics of the three-dimensional inspection device 10 in the form of functional blocks, according to one particular embodiment of the disclosure.

The inspection device 10 comprises means for scanning the blade to be inspected. These scanning means are provided with laser measurement modules and driving means as described further above with reference to FIG. 1.

The inspection device 10 comprises means 12 for building a virtual three-dimensional representation of the blade using data (or measuring points) derived from the scanning means 11. To this end, the inspection device 10 implements a software program for processing clouds of points and for the virtual three-dimensional representation of the blade to be inspected. The data coming from the modules take the form of clouds of points of co-ordinates defined in a three-dimensional space. The time needed to read the points is relatively short (between 1 to 30 million points, depending on the number of measurement modules, are acquired in a time span of one second to five seconds). In general, a single 360-degree rotation of the blade (at the altitude where a measurement of the blade is necessary) is enough to acquire all the measuring points needed for the three-dimensional rebuilding and the dimensional inspection of the component.

The inspection device 10 comprises means 13 of dimensional inspection of the blade according to the virtual three-dimensional representation obtained by the building means 12. The inspection means 13 are configured to deliver 14 at least one quantity representing a dimension of the blade or a piece of information accepting or rejecting the component subjected to inspection according to the result of the inspection made by the inspection means 13 (compliance or non-compliance with dictated dimensional and/or geometrical tolerance values, etc.).

FIG. 4A illustrates an exemplary structure of the inspection device 10 for a particular embodiment. The inspection device 10 includes at least one non-transitory computer-readable medium 150 and a processor unit 160, e.g. having a microprocessor µP, which is controlled by code instructions of a computer program 170, which is stored on medium 150. When executed by the processing unit 160, the code instructions configure the inspection device 10 to perform and control a contactless three-dimensional inspection as described herein, such as the functional blocks shown in FIG. 4.

Such an inspection device can easily be integrated into a production line.

Thus, the device according to the disclosure enables an automatic, complete and contactless inspection of a turbine blade for an aircraft and more generally for a turbomachine capable of having different shapes and dimensions.

Finally, in order to determine the position of the main axis of the blade, the inspection device 1 can provide for the presence of one or more additional measurement modules 4A, 4B, 4C, 4D, disposed fixedly relative to the frame 7 and perpendicular to the holding arms 6A and 6B. This is obtained by activating the means for driving the blade 5 in rotation and in translation so as to scan the surface of the holding arms 6A and 6B respectively throughout their rim and at a given height.

An exemplary embodiment of the present disclosure overcomes the various drawbacks of these prior art techniques of dimensional measurement and inspection.

More specifically, an exemplary embodiment provides a three-dimensional inspection device that enables, contactless, complete, automatic, dimensional inspection of blades for turbomachines.

Although the present disclosure has been described with reference to one or more examples, workers skilled in the art will recognize that changes may be made in form and detail without departing from the scope of the disclosure and/or the appended claims.

The invention claimed is:

1. A method of contactless three-dimensional inspection of a blade for a turbomachine, said blade comprising a body extending radially along a main axis between a blade root and a blade tip, the body having a defined height and comprising a first main face and a second main face terminated by a leading edge and a trailing edge, the method comprising:

scanning said blade with laser measurement modules while rotationally driving, about the main axis, said blade relative to the laser measurement modules or vice versa, and while translationally driving, in translation along the main axis, said blade relative to the laser measurement modules or vice versa;

building a three-dimensional virtual representation of said blade using data obtained from said scanning;

dimensionally inspecting using said three-dimensional virtual representation;

the laser measurement modules comprising a first laser measurement module oriented towards the first main face of said blade and a second laser measurement module oriented towards the second main face of said blade;

said laser measurement modules being oriented relative to said blade so that:

during rotation of said laser measurement modules or of said blade about the main axis, said scanning entails a scan the first and second main faces of said blade on the entire rim of said blade, and during translation of said laser measurement modules or of said blade along the main axis, said scanning entails a scan the first and second main faces of said blade throughout their height.

2. A method according to claim 1, wherein each laser measurement module comprises a source of emission of a laser beam oriented relative to the main axis and relative to a tangential axis of said blade and a laser beam receiver oriented to pick up the laser beam coming from said blade.

3. A method according to claim 2, wherein the laser beam is oriented relative to the main axis by a first angle ranging from 10 to 45 degrees and relative to the tangential axis by a second angle ranging from 10 to 45 degrees.

4. A method according to claim 1, wherein the scanning comprises simultaneously driving in rotation and in translation.

5. A method according to claim 1, wherein each laser measurement module includes a line-type laser emitting source.

* * * * *